UNITED STATES PATENT OFFICE.

FREDERICK R. FARWELL AND FOSTER P. RHINES, OF WATERTOWN, NEW YORK.

INSECTICIDE.

SPECIFICATION forming part of Letters Patent No. 436,848, dated September 23, 1890.

Application filed March 31, 1890. Serial No. 346,007. (No specimens.)

*To all whom it may concern:*

Be it known that we, FREDERICK R. FARWELL and FOSTER P. RHINES, citizens of the United States, residing at Watertown, in the county of Jefferson and State of New York, have invented certain new and useful Improvements in Insecticide Compounds; and we do hereby declare the following to be a full, clear, and exact description of the invention, such as will enable others skilled in the art to which it appertains to make and use the same.

Our invention relates to an improved insecticide compound; and it consists in the commingling of certain ingredients hereinafter specified and claimed.

The object of our invention is to provide an insecticide compound adapted for external application to animals to relieve them from the annoyances of gnats, flies, mosquitoes, &c., or avoiding the necessity of nets, blankets, &c., and further, one which will be simple, uninjurious, or non-annoying, easily applied, and cheaply manufactured.

In the preparation of a compound of this nature it is of the greatest importance to preclude therefrom all ingredients which will impair the growth of hair, cause an irritation of the skin, or in any way injure or annoy the animals to which it is applied, and yet have it retain the essentials for driving away worrying insects. To this end the aim and purpose of our invention are directed.

In compounding and forming our invention we utilize the vegetable products commonly known as "water-pepper" (*Polygonum hydropiper*) and "wormwood," (*Artemisia*.) These two ingredients are first subjected to a suitable process to procure the extract or juices. We then mix the resultant or extract in about the proportion of two parts water-pepper to one of the wormwood. We then add about two parts water and one part alcohol to liquefy, dilute, and preserve the mixture, and keep it in a fresh state.

The amount of water and alcohol of course may be varied, or may be dispensed with and other well-known ingredients substituted, which would have substantially the same effect.

In specifying the proportions of the extracts we do not wish to be understood as limiting ourselves to the same, as it is evident that they may be varied at will. It is also apparent that our compound may be prepared by mixing the water-pepper and wormwood while in a powdered form with a liquid, and a beneficial result will be derived.

In applying our compound to the skin of the animal we first dip an ordinary grooming-brush or other suitable article in the liquid, and with this, or by a spray, apply it until the hide is thoroughly impregnated or treated. It then becomes dry and the insects will avoid it. The application may be made at intervals, as occasion demands.

It will be noticed that only vegetable matter is employed in forming our compound, thereby avoiding the danger common to the application of acids or alkalies.

Having thus described our invention, what we claim as new, and desire to secure by Letters Patent of the United States, is—

An insecticide compound consisting of the extracts of water-pepper and wormwood, substantially as described.

In testimony whereof we affix our signatures in presence of two witnesses.

FREDERICK R. FARWELL.
    FOSTER P. RHINES.

Witnesses:
 ROBT. J. BUCK,
 FRANK L. DEAN.